(12) United States Patent
Dellock et al.

(10) Patent No.: US 11,161,968 B2
(45) Date of Patent: Nov. 2, 2021

(54) ULTRA-LOW DENSITY POLYPROPYLENE PLASTIC COMPOUND

(71) Applicant: Ford Global Technologies, LLC, Dearborn, MI (US)

(72) Inventors: Paul Kenneth Dellock, Northville, MI (US); Richard Gall, Ann Arbor, MI (US); Stuart C. Salter, White Lake, MI (US); Talat Karmo, Waterford, MI (US); LaRon Michelle Brown, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/783,675

(22) Filed: Feb. 6, 2020

(65) Prior Publication Data

US 2020/0172704 A1 Jun. 4, 2020

Related U.S. Application Data

(63) Continuation-in-part of application No. 15/958,633, filed on Apr. 20, 2018, now Pat. No. 10,590,269.

(51) Int. Cl.
| | |
|---|---|
| *C08K 7/28* | (2006.01) |
| *C08K 3/30* | (2006.01) |
| *C08K 3/40* | (2006.01) |
| *C08K 3/34* | (2006.01) |

(52) U.S. Cl.
CPC ............ *C08K 7/28* (2013.01); *C08K 3/30* (2013.01); *C08K 3/346* (2013.01); *C08K 3/40* (2013.01); *C08K 2003/3045* (2013.01); *C08K 2201/019* (2013.01)

(58) Field of Classification Search
CPC .. C08K 3/40; C08K 7/28; C08L 23/10; C08L 23/12; C08L 23/14; C08L 23/142
See application file for complete search history.

(56) References Cited

U.S. PATENT DOCUMENTS

| | | | | |
|---|---|---|---|---|
| 2007/0191530 A1* | 8/2007 | Ka | ............ | C08L 23/10 524/451 |
| 2009/0011183 A1* | 1/2009 | Kochem | ............ | G09F 3/04 428/119 |
| 2010/0298456 A1* | 11/2010 | Nakajima | ............ | C08L 23/10 521/134 |
| 2013/0116353 A1* | 5/2013 | Jang | ............ | C08L 77/02 521/91 |
| 2014/0088244 A1* | 3/2014 | Takeishi | ............ | C08K 9/06 524/584 |
| 2017/0305124 A1* | 10/2017 | German, Jr. | ............ | B32B 27/32 |
| 2018/0371210 A1* | 12/2018 | Dix | ............ | C08L 23/12 |

* cited by examiner

*Primary Examiner* — Jeffrey C Mullis

(74) *Attorney, Agent, or Firm* — Burris Law, PLLC

(57) ABSTRACT

A composite material includes polypropylene in an amount between 60 wt. % and 95 wt. %, glass bubbles in an amount between 3.0 wt. % and 20.0 wt. %, a secondary structural filler of magnesium oxysulfate or wollastonite in an amount greater than 0.0 wt. % and up to 30.0 wt. %, and at least one additive. In one form of the composite material, the secondary structural filler is either magnesium oxysulfate or wollastonite. In another form the magnesium oxysulfate is in an amount between 2.0 wt. % and 6.0 wt. %. in yet another form the wollastonite is in an amount between 6.0 wt. % and 12.0 wt. %.

8 Claims, No Drawings

ULTRA-LOW DENSITY POLYPROPYLENE PLASTIC COMPOUND

CROSS-REFERENCE TO RELATED APPLICATIONS

This application is a continuation-in-part of U.S. application Ser. No. 15/958,633, filed on Apr. 20, 2018, titled "ULTRA-LOW DENSITY POLYPROPYLENE PLASTIC COMPOUND." The disclosure of the above application is incorporated herein by reference.

FIELD

The present disclosure relates to polypropylene composite materials.

BACKGROUND

The statements in this section merely provide background information related to the present disclosure and may not constitute prior art.

Fuel efficiency has been a motivating force behind vehicle design in recent years and will likely continue in the foreseeable future. As such, reducing the weight of the vehicle, improving aerodynamics, and improved efficiency in design will remain priorities for vehicle designers. In addition to fuel efficiency, reduced cost of components, including parts, assemblies, and subsystems, among others, is another priority for vehicle designers and manufacturers.

Accordingly, composite materials have been used to reduce the weight of vehicles, however, their costs have been much higher than traditional materials such as steel or aluminum. One such composite material that is used in a variety of vehicle components is mineral or talc filled polypropylene copolymers. Polypropylene copolymer parts often include talc in about 20 wt. % as a structural filler to improve mechanical properties. Generally, polypropylene copolymers are available at a low cost, and the addition of talc improves stiffness, impact strength, and heat resistance.

However, talc-filled polypropylene copolymers still have a relatively high density (between about 1.04 and 1.06 gm/cm$^3$). Furthermore, the addition of other components to the polypropylene copolymer composite such viscosity agents, which improve moldability (e.g., injection molding) of the polypropylene copolymer composite, further increases density and overall costs.

The present disclosure addresses these challenges related to the design and manufacture of lighter weight and lower cost vehicle components.

SUMMARY

This section provides a general summary of the disclosure and is not a comprehensive disclosure of its full scope or all of its features.

In one form of the present disclosure, a composite material is provided. The composite material comprises a polypropylene in an amount between 60 wt. % and 95 wt. %, glass bubbles in an amount between 3.0 wt. % and 20.0 wt. %, a secondary structural filler in an amount greater than 0.0 wt. % and up to 30.0 wt. %, and at least one additive.

In another form of the present disclosure, the secondary structural filler is selected from the group consisting of magnesium oxysulfate and wollastonite.

In forms where the secondary structural filler is magnesium oxysulfate, the magnesium oxysulfate is in an amount greater than 0.0 wt. % and up to 20.0 wt. % or the magnesium oxysulfate is in an amount between 2.0 wt. % and 6.0 wt. %.

In forms where the secondary structural filler is wollastonite, the wollastonite is in an amount greater than 0.0 wt. % and up to 30.0 wt. % or the wollastonite is in an amount between 6.0 wt. % and 12.0 wt. %.

In yet another form of the present disclosure, the polypropylene is between 81 wt. % and 89 wt. %, the glass bubbles are between 4.0 wt. % and 7.0 wt. %, the secondary structural filler is one of magnesium oxysulfate between 2.0 wt. % and 6.0 wt. % or wollastonite between 6.0 wt. % and 12.0 wt. %, and the at least one additive comprises a nucleator between 0.2 wt. % and 0.4 wt. %, a coupling agent between 0.5 wt. % and 2.0 wt. %, a UV stabilizer greater than 0.0 wt. % and up to 0.6 wt. %, and an antioxidant greater than 0.0 wt. % and up to 0.5 wt. %.

In at least one form of the present disclosure, the composite material further comprises a color additive in an amount between 1.0 wt. % and 3.0 wt. %.

In variations of the present disclosure, a vehicle part comprises the composite material.

In numerous forms of the present disclosure, the additive is selected from the group consisting of a nucleator, a coupling agent, an antioxidant, a UV stabilizer, and color.

In some forms of the present disclosure, no talc is contained within the composite material.

In another form of the present disclosure, the composite material has the mechanical properties of a tensile yield strength of at least 20 MPa, a tensile modulus of at least 2100 MPa, and at least one of a notched Charpy impact at 23° C. of at least 24 kJ/m$^2$, a notched Charpy impact at 0° C. of at least 8.2 kJ/m$^2$, a notched Charpy impact at −40° C. of at least 4.8 kJ/m$^2$, a flexural modulus of at least 1520 MPa, and a heat deformation temperature at 1.8 MPa of at least 65° C.

Alternatively, in another form of the present disclosure, a composite material is provided. the composite material comprises a polypropylene in an amount between 81 wt. % and 89 wt. %, glass bubbles in an amount between 4.0 wt. % and 7.0 wt. %, a secondary structural filler comprising one of magnesium oxysulfate in an amount between 2.0 wt. % and 6.0 wt. % or wollastonite in an amount between 6.0 wt. % and 12.0 wt. %, and additives. The additives comprise a nucleator in an amount between 0.2 wt. % and 0.4 wt. %, a coupling agent in an amount between 0.5 wt. % and 2.0 wt. %, a UV stabilizer in an amount greater than 0.0 wt. % and up to 0.6 wt. %, and an antioxidant in an amount greater than 0.0 wt. % and up to 0.5 wt. %.

In another form of the present disclosure, the additive further comprises a color additive in an amount between 1.0 wt. % and 3.0 wt. %.

In at least one form of the present disclosure, a part is formed from the composite material and has mechanical properties of a tensile yield strength of at least 20 MPa, a tensile modulus of at least 2100 MPa, and at least one of a notched Charpy impact at 23° C. of at least 24 kJ/m$^2$, a notched Charpy impact at 0° C. of at least 8.2 kJ/m$^2$, a notched Charpy impact at −40° C. of at least 4.8 kJ/m$^2$, a flexural modulus of at least 1520 MPa, and a heat deformation temperature at 1.8 MPa of at least 65° C.

Alternatively, in yet another form of the present disclosure, a composite material is provided. The composite material comprises a polypropylene in an amount between 81 wt. % and 89 wt. %, glass bubbles in an amount between 4.0 wt. % and 7.0 wt. %, a secondary structural filler comprising one of magnesium oxysulfate in an amount between 2.0 wt. % and 6.0 wt. % or wollastonite in an amount between 6.0 wt. % and 12.0 wt. %, and additives. The additives comprise a nucleator in an amount between 0.2 wt. % and 0.4 wt. %, a coupling agent in an amount between 0.5 wt. % and 2.0 wt. %, a UV stabilizer in an amount greater than 0.0 wt. % and up to 0.6 wt. %, an antioxidant in an amount greater than 0.0 wt. % and up to 0.5 wt. %, and color in an amount between 1.0 wt. % and 3.0 wt. %.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features.

Generally, the present disclosure provides a unique composite material that includes a polypropylene, at least one structural filler, and at least one additive, which results in a material that reduces overall material density while increasing ductility and strength at a reduced cost. For certain applications, the composite material is injection moldable, and the inventors have discovered that the composite material according to the teachings of the present disclosure can provide the desired mechanical properties and reduced density without containing any talc. More specifically, the teachings of the present disclosure are aimed at door claddings, wheel lip moldings, rocker moldings, and other parts/components that are subjected to impacts.

Each of the elements of the composite material of the present disclosure and their criticality in achieving the light weight, lower cost, and improved mechanical properties, in particular for vehicle component/part applications, is now described in greater detail.

Polypropylene

The inventors have discovered a unique composition that includes a polypropylene, which in one form is an impact copolymer having a rubber content greater than zero and less than about 25 wt. %. The impact copolymer having a rubber content is used in the inventive composite material to provide improved cold impact properties. In one form, the impact copolymer is in an amount between about 60 wt. % and about 95 wt. %, and more specifically, between 81 wt. % and 89%. While higher amounts of the copolymer will provide higher elongation, these higher amounts will have less heat deflection and strength, and thus the ranges provided herein are critical to achieving a balance of overall properties for the specific applications as set forth herein. Additional, more targeted percentages for the copolymer, along with other ingredients such as structural fillers and additives, are described in greater detail below, along with exemplary test data that demonstrates the criticality of the compositional ranges of the present disclosure. Further, it should be understood that a polypropylene blend as described in co-pending application Ser. No. 15/958,633, as incorporated above, may also be employed while compounding a rubber separately.

Structural Fillers

A variety of structural fillers are contemplated according to the present disclosure to improve mechanical properties of the composite material, including but not limited to tensile yield strength, yield elongation, tensile modulus, and flexural modulus. Generally, structural fillers are provided in an amount between about 3.0 wt. % and 50.0 wt. %. The structural fillers may include glass bubbles (i.e. hollow glass spheres) and magnesium oxysulfate (e.g. sold under the trademark MOS-HIGE®) or wollastonite (e.g. $CaSiO_3$), among others.

In one form, the glass bubbles are in an amount between about 3.0 wt. % and about 20.0 wt. %, and more specifically between about 4.0 wt. % and 7.0 wt. %. While providing lighter weight, increased strength, and increased heat deflection to the composite material of the present disclosure, if the percentage of glass bubbles is too high, this could result in added cost, reduced ductility, and reduced impact strength.

Advantageously, the composite material in one form does not contain any talc with the use of the glass bubbles.

In one form, the glass bubbles have the properties and characteristics set forth below in TABLE 1:

TABLE 1

| Properties of Glass Bubbles/Hollow Glass Spheres | |
|---|---|
| Property | Value |
| Crush strength, 90% survival by volume (ksi) | 16 (115 MPa) @ 90% survival |
| Flotation (density <1.0 g/cm^3) | 96% |
| Hardness | Mohs scale 5 |
| Packing factor (bulk density to true particle density) | 60% |
| pH (at 5 wt. % loading in water) | 9.5 |
| Shape | Hollow bubbles with thin walls |
| Softening point (° C.) | >600 |
| True density (g/cm^3) | 0.46 ± 0.03 |
| Typical D10 Diameter (μm) | 12 |
| Typical D50 Diameter (Median) (μm) | 20 |
| Typical D90 Diameter (μm) | 30 |
| Volatile content (by weight) | 0.50% |

These glass bubbles are structural fillers that recoup the degradation of properties seen when substituting conventional glass spheres for talc, yielding a less expensive and lower density polypropylene copolymer composite material. This glass bubble is a chemically strengthened high-strength glass sphere developed to withstand forces of at least 115 MPa (16,000 psi). Many vehicle parts experience molding forces of at least 100 MPa (14,000 psi) during the molding process. The glass bubble used in the composite material of the present disclosure withstands these pressures yet has a density of about 0.46 g/cm^3 which is about a sixth (⅙) the density of talc (about 2.6 to about 2.8 g/cm^3). As such, when substituting all or most talc (about 22 wt. % or about 8.5 vol. %) with an equivalent volume percent of these glass bubbles, the glass bubbles comprise a little more than 4.5 wt. % at that 8.5 vol. %. While the glass bubbles are more expensive (about 5× per pound more than the talc), at about ⅙ of the volume of the talc, the glass bubbles are overall more economical with improved performance capabilities/mechanical properties.

The geometry of the glass bubbles also improves the viscosity of the composite material during molding and reduces molding pressures vs talc filled plastics (e.g. polypropylene copolymer). The lower mass of the polypropylene copolymer composite part results in less energy to heat or cool the plastic, thus enabling faster cycle times and higher part throughputs. Consequently, reducing the environmental impact and life-cycle costs for both the manufacture of the vehicle and the vehicle.

Secondary Structural Fillers

In addition to the glass bubbles as set forth above, the present disclosure also includes magnesium oxysulfate (e.g. MOS-HIGE®) or wollastonite ($CaSiO_3$). The magnesium oxysulfate in the composite material of the present disclosure is between about 0.0% wt. % and about 20.0 wt. %, and more specifically between about 2.0 wt. % and about 6.0 wt. %. Alternatively, the wollastonite in the composite material of the present disclosure is between about 0.0% wt. % and about 30.0 wt. %, specifically between about 2.0 wt. % and about 20.0 wt. %, and more specifically between about 6.0 wt. % and about 12.0 wt. %. In some formulations, the composite material includes magnesium oxysulfate between about 0.0 wt. % and about 6.0 wt. % and wollastonite between about 0.0% wt. % and about 10.0 wt.

Magnesium oxysulfate comprises fibers between 7 µm and 13 µm long with an average length of 10 µm; the fibers generally have diameters between 0.4 µm and 0.7 µm, and an average diameter of 0.5 µm. Magnesium oxysulfate generally has a pre-compounding average aspect ratio of 20 and a post-compounding average aspect ratio of 10. Magnesium oxysulfate has a density between 2.0 $g/cm^3$ and 2.5 $g/cm^3$. Magnesium oxysulfate is present as fibers or whiskers. Magnesium oxysulfate fillers improve composite ductility over glass fiber/whisker or carbon fiber/whisker products, while maintaining sufficient stiffness.

Wollastonite is a calcium inosilicate material ($CaSiO_3$) that may substitute small amounts of calcium for iron, magnesium, manganese, and zinc (e.g. rhodonite). Wollastonite comprises fibers between 20 µm and 200 µm long with an average length of 100 µm; the fibers generally have diameters between 5 µm and 20 µm, and an average diameter of 10 µm. Wollastonite is a low cost structural filer with a density between 2.86 $g/cm^3$ and 3.09 $g/cm^3$. Wollastonite is present as fibers or whiskers. Wollastonite fillers improve composite ductility over glass fiber/whisker or carbon fiber/whisker products, while maintaining sufficient stiffness.

Additives

A variety of additives may be employed according to the teachings of the present disclosure. The additives include, but are not limited to, a coupling agent, an antioxidant, a UV stabilizer, and color.

Antioxidant

An antioxidant may be used to inhibit oxidation during processing of the inventive composite material. Antioxidants act as melt processing stabilizers, improving heat stability and oxidation resistance. The addition of about 0.0 to about 0.5 wt. % antioxidant achieves the desired results, and in one form, an amount of about 0.3 wt. % is used. The maximum amount of antioxidant according to the teachings of the present disclosure is about 5.0 wt. %.

Coupling Agent

A polymer based resin is used as a coupling agent in one form of the present disclosure. The addition of about 0.5 to about 2.0 wt. %, and in one form 1.0%, coupling agent achieves the desired results. The maximum amount according to the teachings of the present disclosure is about 4.0 wt. %.

Nucleator

A nucleator is provided to enhance polymer nucleation, thus improving the coefficient of linear thermal expansion (CLTE), heat deflection temperature (HDT), impact resistance, molding speed, and stiffness. The addition of about 0.2 to about 0.4 wt. %, and in one form 0.3 wt. %, nucleator achieves the desired results. The maximum amount according to the teachings of the present disclosure is about 1.0 wt. %.

Ultraviolet (UV) Stabilizer

A UV stabilizer is contemplated in applications that receive excessive amounts of UV radiation, such as exterior components of a vehicle, including by way of example, the door claddings and moldings as set forth herein. The addition of about 0.0 to about 2.0 wt. %, and in one form 0.0 wt. % to about 0.6 wt. %, UV stabilizer achieves the desired results. The maximum amount according to the teachings of the present disclosure is about 2.0 wt. %.

Colorants

Colorants, or color additives, are added to the composite material depending on the desired color for a given application. Commercially available polypropylene compatible colorants may be employed as appropriate. In one form, color concentrate is used in an amount between about 1.0 wt. % and about 3.0 wt. %, and in one form is a black concentrate used in an amount of about 1.0 wt. %.

Mechanical Properties

Various improved mechanical properties that are achieved with the innovative composite material of the present disclosure are provided in greater detail below with reference to specific testing.

The following specific compositions are given to illustrate the unique composite material, properties, and use of composite materials prepared according to the teachings of the present disclosure and should not be construed to limit the scope of the disclosure. Those skilled in the art, in light of the present disclosure, will appreciate that slight changes can be made in the specific compositions to achieve equivalents that obtain alike or similar results without departing from or exceeding the spirit or scope of the present disclosure.

Exemplary compositions according to experimental testing are found below in Tables 2 and 3. Table 2 includes the compositions of four (4) compositions/formulations according to the teachings of the present disclosure, and Table 3 includes the mechanical properties of each of these compositions. (In Tables 2 and 3 Inventive Composition is abbreviated as "Inv. Comp.")

TABLE 2

| | Inventive Compositions | | | | | |
|---|---|---|---|---|---|---|
| COMPONENT | Inv. Comp. A wt. % | Inv. Comp. B wt. % | Inv. Comp. C wt. % | Inv. Comp. D wt. % | Inv. Comp. E wt. % | Inv. Comp. F wt. % |
| Polypropylene | 88.4 | 86.9 | 83.4 | 81.9 | 87.4 | 85.9 |
| Nucleator | 0.3 | 0.3 | 0.3 | 0.3 | 0.3 | 0.3 |

TABLE 2-continued

Inventive Compositions

| COMPONENT | Inv. Comp. A wt. % | Inv. Comp. B wt. % | Inv. Comp. C wt. % | Inv. Comp. D wt. % | Inv. Comp. E wt. % | Inv. Comp. F wt. % |
|---|---|---|---|---|---|---|
| Glass Bubbles | 6 | 6 | 6 | 6 | 5 | 5 |
| Magnesium Oxysulfate | 4 | 4 | | | 3 | 3 |
| Wollastonite | | | 9 | 9 | 3 | 3 |
| Coupling Agent | 1 | 1 | 1 | 1 | 1 | 1 |
| Ultraviolet Light Stabilizers | | 0.5 | | 0.5 | | 0.5 |
| Antioxidant | 0.3 | 0.3 | 0.3 | 0.3 | 0.3 | 0.3 |
| Colorant | | 1 | | 1 | | 1 |

TABLE 3

Mechanical Property Data of Inventive Compositions

| MATERIAL PROPERTIES | Inv. Comp. A | Inv. Comp. B | Inv. Comp. C | Inv. Comp. D | Inv. Comp. E | Inv. Comp. F | Comparative Values |
|---|---|---|---|---|---|---|---|
| Yield Strength per ISO 527 (MPa) | 20.2 | 20.4 | 20.8 | 21 | 20.2 | 20.4 | 17 |
| Tensile Modulus per ISO 527 (MPa) | 2160 | 2180 | 2220 | 2230 | 2160 | 2180 | 1700 |
| Notched Charpy at 23° C. per ISO 179 (kJ/m^2) | 31 | 29 | 25 | 24 | 25 | 24 | 23 |
| Notched Charpy at 0° C. per ISO 179 (kJ/m^2) | 9.4 | 8.7 | 8.5 | 8.2 | 8.5 | 8.2 | 8 |
| Notched Charpy at −40° C. per ISO 179 (kJ/m^2) | 5.2 | 5.1 | 4.9 | 4.8 | 4.9 | 4.8 | 2.6 |
| Flexural Modulus per ISO 178 (MPa) | 1520 | 1550 | 1620 | 1640 | 1520 | 1550 | 1490 |
| Heat Deflection Temperature (° C.) at 1.8 MPa per ISO 175 | 66 | 65 | 69 | 68 | 66 | 65 | 47 |
| Density per ISO 1183 (g/c^3) | 0.84 | 0.84 | 0.89 | 0.89 | 0.84 | .84 | 0.99-1.05 |

As shown, the improvements in mechanical properties with respect to the baseline compositions is remarkable and includes lower density while reducing cost. This careful balance of increased mechanical properties, lighter weight, and lower cost has been achieved by the inventors through extensive testing and analysis of surprising results.

Accordingly, a novel composite material has been developed by the inventors that utilizes glass bubbles to significantly reduce the density of the polymer while delivering a low cost solution to increase the ductility and strength of the resin at an affordable cost. The inventors were surprised to discover that the use of additives and the addition of small amounts of structural fillers recouped the degradation of properties seen when substituting glass bubbles for talc. Therefore, the teachings of the present disclosure yield a low density material that is lower cost than exiting state of the art materials.

As used herein, it should be understood that the term "structural component" should be construed to mean a part or component that carries structural loads (e.g., tension, compression, bending), and transfers those loads to and from adjacent components, versus a part that is merely used as a fairing or cover, and which carries no significant loads. One skilled in the art of vehicle design understands this distinction.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A composite material comprising:
   a polypropylene in an amount between 81 wt. % and 89 wt. %;
   glass bubbles in an amount between 4.0 wt. % and 7.0 wt. %;
   a secondary structural filler comprising one of magnesium oxysulfate in an amount between 2.0 wt. % and 6.0 wt. % or wollastonite in an amount between 6.0 wt. % and 12.0 wt. %; and
   additives comprising:
      a nucleator in an amount between 0.2 wt. % and 0.4 wt. %;
      a coupling agent in an amount between 0.5 wt. % and 2.0 wt. %;

a UV stabilizer in an amount greater than 0.0 wt. % and up to 0.6 wt. %; and
an antioxidant in an amount greater than 0.0 wt. % and up to 0.5 wt. %.

2. The composite material according to claim 1 further comprising a color additive in an amount between 1.0 wt. % and 3.0 wt. %.

3. A vehicle part comprising the composite material according to claim 1.

4. The composite material according to claim 1, wherein no talc is contained within the composite material.

5. A part formed from the composite material according to claim 1 having mechanical properties of:
 a tensile yield strength of at least 20 MPa;
 a tensile modulus of at least 2100 MPa;
 at least one of:
  a notched Charpy impact at 23° C. of at least 24 kJ/m$^2$;
  a notched Charpy impact at 0° C. of at least 8.2 kJ/m$^2$;
  a notched Charpy impact at −40° C. of at least 4.8 kJ/m$^2$;
 a flexural modulus of at least 1520 MPa; and
 a heat deformation temperature at 1.8 MPa of at least 65° C.

6. A composite material comprising:
 a polypropylene in an amount between 81 wt. % and 89 wt. %;
 glass bubbles in an amount between 4.0 wt. % and 7.0 wt. %;
 a secondary structural filler comprising one of magnesium oxysulfate in an amount between 2.0 wt. % and 6.0 wt. % or wollastonite in an amount between 6.0 wt. % and 12.0 wt. %; and
 additives comprising:
  a nucleator in an amount between 0.2 wt. % and 0.4 wt. %;
  a coupling agent in an amount between 0.5 wt. % and 2.0 wt. %;
  a UV stabilizer in an amount greater than 0.0 wt. % and up to 0.6 wt. %;
  an antioxidant in an amount greater than 0.0 wt. % and up to 0.5 wt. %; and
  color in an amount between 1.0 wt. % and 3.0 wt. %.

7. A vehicle part comprising the composite material according to claim 6.

8. The composite material according to claim 6, wherein no talc is contained within the composite material.

* * * * *